United States Patent
Moncada et al.

(10) Patent No.: US 12,103,280 B2
(45) Date of Patent: Oct. 1, 2024

(54) INTEGRAL LAYERED ARTICLES AND THEIR METHOD OF MANUFACTURE

(71) Applicants: DOW GLOBAL TECHNOLOGIES LLC, Midland, MI (US); DOW SILICONES CORPORATION, Midland, MI (US)

(72) Inventors: Adriana Moncada, Midland, MI (US); Wenyi Huang, Midland, MI (US); Michael H. Wang, Midland, MI (US); Mark Fisher, Midland, MI (US)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 296 days.

(21) Appl. No.: 17/629,310

(22) PCT Filed: Jul. 20, 2020

(86) PCT No.: PCT/US2020/042721
§ 371 (c)(1),
(2) Date: Jan. 21, 2022

(87) PCT Pub. No.: WO2021/016156
PCT Pub. Date: Jan. 28, 2021

(65) Prior Publication Data
US 2022/0250370 A1     Aug. 11, 2022

Related U.S. Application Data

(60) Provisional application No. 62/877,346, filed on Jul. 23, 2019.

(51) Int. Cl.
| | |
|---|---|
| B32B 27/32 | (2006.01) |
| B32B 7/10 | (2006.01) |
| B32B 25/08 | (2006.01) |
| B32B 25/20 | (2006.01) |
| B32B 27/10 | (2006.01) |
| B32B 27/20 | (2006.01) |
| B32B 37/24 | (2006.01) |
| C08J 7/04 | (2020.01) |

(52) U.S. Cl.
CPC ............ *B32B 27/32* (2013.01); *B32B 7/10* (2013.01); *B32B 25/08* (2013.01); *B32B 25/20* (2013.01); *B32B 27/10* (2013.01); *B32B 27/20* (2013.01); *B32B 37/24* (2013.01); *C08J 7/0427* (2020.01); *B32B 2037/243* (2013.01); *B32B 2255/10* (2013.01); *B32B 2307/306* (2013.01); *C08J 2383/04* (2013.01)

(58) Field of Classification Search
None
See application file for complete search history.

(56) References Cited

U.S. PATENT DOCUMENTS

| | | |
|---|---|---|
| 5,366,806 A | 11/1994 | Fujiki et al. |
| 2008/0177000 A1 | 7/2008 | Ahn et al. |
| 2011/0060099 A1 | 3/2011 | Ahn et al. |
| 2017/0073518 A1 | 3/2017 | Morita et al. |
| 2017/0191586 A1* | 7/2017 | Nadeau .................. B32B 25/20 |

FOREIGN PATENT DOCUMENTS

| | | |
|---|---|---|
| EP | 0276790 A2 | 8/1988 |
| EP | 0540259 A1 | 5/1993 |

OTHER PUBLICATIONS

International Search Report for PCT/US2020/042721 dated Oct. 23, 2020, 3 pages.

* cited by examiner

*Primary Examiner* — Ramsey Zacharia
(74) *Attorney, Agent, or Firm* — Warner Norcross + Judd LLP

(57) ABSTRACT

An integral modified polyolefin resin/silicone elastomer layered article is provided together with a method for its production. The integral polyolefin-based resin/silicone elastomeric material article comprises a shaped layer of a polyolefin-based copolymer or grafted polyolefin. It contains silyl trialkoxy groups, carboxylic acid groups and/or —OH groups. A silicone elastomeric material layer is subsequent to being cured from a hydrosilylation curable silicone elastomer composition comprising one or more adhesion promoters.

20 Claims, No Drawings

INTEGRAL LAYERED ARTICLES AND THEIR METHOD OF MANUFACTURE

CROSS-REFERENCE TO RELATED APPLICATIONS

This application is the U.S. National Stage of International Application No. PCT/US2020/042721 filed on 20 Jul. 2020, which claims priority to and all advantages of U.S. Provisional Application No. 62/877,346 filed on 23 Jul. 2019, the content of which is incorporated herein by reference.

The present disclosure relates to an integral modified polyolefin resin/silicone elastomer layered article and a method for its production.

Silicone elastomeric materials are acknowledged to be highly reliable with respect to applications such as heat resistance and weatherability in the fields of electric and electronic equipment and automobiles. Whilst in some applications silicone elastomeric materials may be used alone, in others there is a desire to have integral layered, e.g., molded articles in combination with thermoplastic resins, especially polyolefin resins, wherein the polyolefin resins and silicone elastomeric materials are firmly united or bonded together. These integrally layered articles are also considered beneficial in certain applications for electric equipment, electronic equipment, automobiles, precision machines and the like.

However, the desire for these integrally layered articles has created a long-term challenge to the industry, given the fact that polyolefin resins have no functional groups available to link such resins to silicone elastomer-based products. The unreactive nature of polyolefins e.g., polyethylene and polypropylene, has proven to be a drawback in the development of such integral articles because strong bonding between polyolefin resins (for example, polyethylene resin or polypropylene resin) and silicone elastomers has proven difficult to generate. The following disclosure seeks to address the challenge of adhering polyolefin resins such as polypropylene and polyethylene resins to hydrosilylation cured silicone rubbers.

A variety of methods have been proposed to produce bonding at the polyolefin and silicone elastomeric material interface. For example, surfaces of polyethylene resin articles have been treated by corona discharge or plasma glow discharge to create a reactive surface to which a curable silicone rubber material can be applied and subsequently cured. However, the polyethylene resin/silicone elastomer bonding strength was not been found to be strong enough for industrial/practical use.

Primers have been proposed to provide the required bonding between addition curing type silicone elastomeric materials and organic resins. It is known, for example, to form a bond by applying a primer to a surface of a preformed resin article, applying an uncured silicone elastomeric composition thereto and curing the composition onto the preformed resin article. Efforts have also been made to adhere self-adhesive silicone elastomer compositions by direct curing onto polyolefin resins. Neither have proven to be overly successful.

In US2008177000 and US2011060099, siloxane based polymers containing hydrosilylation curable groups have been introduced into organic resins as additives with a view to adhering the liquid silicone elastomer compositions to the resin substrate via hydrosilylation reactions at the resin/silicone interface. Similarly, organohydrogenpolysiloxanes have been introduced as additives into olefin resins but it was found that their presence within the polyolefin resin may detrimentally affect the properties of the resin material and as such substantially negated this as an option. EP 276,790 discloses a method of integrally joining silicone rubber to an olefin resin having grafted thereto a compound having an aliphatic unsaturated group and a hydrolyzable group attached to a silicon atom and in U.S. Pat. No. 5,366,806 there is described a method for integrally joining silicone rubber to a polyolefin resin having added thereto a compound containing an unsaturated group and a hydrogen atom directly attached to a silicon atom.

Whilst previous efforts have been designed to generate bonding between hydrosilylation curable groups in the form of additives or grafted onto the polyolefin resin with hydrosilylation curable groups in a silicone elastomer composition, the present disclosure seeks to provide an alternative pathway to producing an integral polyolefin-based resin/silicone elastomeric material article from a polyolefin resin and a hydrosilylation cure silicone elastomer composition.

There is provided an integral polyolefin-based resin/silicone elastomeric material article comprising:
a shaped layer of a polyolefin-based copolymer or grafted polyolefin, which polyolefin-based copolymer or grafted polyolefin contains silyl trialkoxy groups, carboxylic acid groups and/or —OH groups; and
a silicone elastomeric material layer chemically bound to the shaped layer which silicone elastomeric material layer is cured from a hydrosilylation curable silicone elastomer composition comprising one or more adhesion promoters.

There is also provided an integral polyolefin-based resin/silicone elastomeric material article obtainable or obtained by the steps of:
preforming a polyolefin-based copolymer or grafted polyolefin, which polyolefin-based copolymer or grafted polyolefin contains silyl trialkoxy groups, carboxylic acid groups and/or —OH groups, into a shaped layer;
contacting polyolefin-based copolymer or grafted polyolefin shaped layer with a hydrosilylation curable silicone elastomer composition, and
curing the silicone elastomer composition causing said composition to chemically bind with the polyolefin-based copolymer or grafted polyolefin shaped layer at a temperature below the softening point of the polyolefin-based copolymer or grafted polyolefin to form said integral polyolefin-based resin/silicone elastomeric material article.

There is also provided a method for preparing an integral polyolefin-based resin/silicone elastomeric material article comprising the steps of:
preforming a polyolefin-based copolymer or grafted polyolefin, which polyolefin-based copolymer or grafted polyolefin contains silyl trialkoxy groups, carboxylic acid groups and/or —OH groups, into a shaped layer;
contacting polyolefin-based copolymer or grafted polyolefin shaped layer with a hydrosilylation curable silicone elastomer composition, and
curing the silicone elastomer composition causing said composition to chemically bind with the polyolefin-based copolymer or grafted polyolefin shaped layer at a temperature below the softening point of the polyolefin-based copolymer or grafted polyolefin to form said integral polyolefin-based resin/silicone elastomeric material article.

There is furthermore provided a use of an integral polyolefin-based resin/silicone elastomeric material article comprising an integral polyolefin-based resin/silicone elastomeric material article made from a polyolefin-based copolymer or grafted polyolefin, which polyolefin-based copolymer or grafted polyolefin contains silyl trialkoxy groups, carboxylic acid groups and/or —OH groups; and a hydrosilylation cured silicone rubber layer for automotive applications, medical applications, consumer and industrial applications, electronic applications and/or 3-D printing applications.

The incorporation of functional groups (e.g., hydroxyl, trimethoxysilyl and carboxylic acid) into polyolefin resins provides accessible chemical linkages able to undergo condensation reactions with Si—H groups introduced into the hydrosilylation curable silicone elastomer compositions, thereby avoiding any need to use of surface treatment technology (e.g., corona and plasma) onto polyolefin parts and/or the need for hydrosilylation interactions between grafted or entrapped groups in the resin and hydrosilylation reactive groups at the surface of the liquid silicone elastomer composition.

Without being tied to current theories it is believed that the alkoxy groups in the trialkoxy silyl grafted compounds undergo hydrolysis under ambient conditions which is accelerated in the presence of a condensation cure catalyst of the type listed under the list of potential components for adhesion promoters and then subsequently undergoes a condensation reaction with Si—H bonds from the silicone rubber which reaction is catalysed by the hydrosilylation catalyst used to cure the silicone rubber, e.g.,

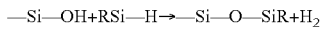

Furthermore, if there are sterically unhindered —OH groups or alkoxy groups present in the silicone rubber e.g., from the adhesion promoter when present in the silicone rubber or functioning as a primer condensation reaction may take place between hydroxyl groups attached to the grafted polyolefin and hydroxyl or alkoxy groups in/on the silicone rubber.

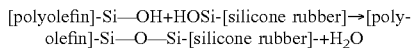

Where acrylic acid groups have been grafted to the polyolefin as described above, carboxylic acid groups can react with Si—H groups from the silicone rubber again catalysed by the hydrosilylation catalyst present in the silicone rubber, i.e., a platinum-based catalyst.

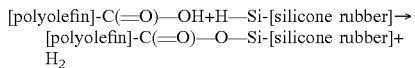

and likewise, in the case of —OH groups pendant from a polyolefin copolymer (e.g., copolymerized with alkylene vinyl alcohols) these will also undergo the following condensation reaction again catalysed by the hydrosilylation catalyst, typically a platinum-based catalyst.

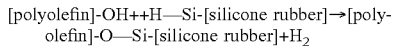

There may well be a combination of the above reactions taking place to aid adhesion dependent on the groups bound to the polyolefin-based resin.

The polyolefin-based copolymer containing silyl trialkoxy groups, carboxylic acid groups and/or —OH groups may be any suitable copolymer made by copolymerising a suitable olefin monomer such as polyethylene, polypropylene, polyisobutylene and polybutylene and a suitable co-monomer, such as for the sake of example, alkylene vinyl alcohols wherein the alkylene group contains from 2 to 15 carbons, alternatively 2 to 10 carbons, alternatively may be selected from an ethylenevinyl alcohol, a propylenevinyl alcohol, a butylenevinyl alcohol, ethylenebutenyl alcohol, a propylenebutenyl alcohol, a butylbutenyl alcohol, ethylenehexenyl alcohol, a propylenehexenyl alcohol and/or a butylenehexenyl alcohol. The copolymerization may take place in any suitable manner.

The grafted polyolefin containing silyl trialkoxy groups, carboxylic acid groups and/or —OH groups may be a polyolefin grafted with a silicon-containing compound containing one or more of the aforementioned groups. The polyolefin resins as hereinbefore described may include, for example, polyethylene, polypropylene, polyisobutylene and polybutylene. Any suitable grafting process may be undertaken to introduce the silyl trialkoxy groups, carboxylic acid groups and/or —OH groups onto the polyolefin resins. The groups may, for example, be grafted to the polyolefin using compounds which contain the required groups and at least one aliphatic unsaturated group capable of radical reaction with free radicals which may be created on the polyolefin resin. The aliphatic unsaturated groups may be selected from, for example, alkenyl groups such as vinyl, allyl, propenyl, and butenyl groups; and acryloxypropyl, methacryloxypropyl, cyclohexenyl, cyclopentadienyl, ethynyl, and cinnamylpropyl groups, etc.

The polyolefin resin may, again for the sake of example, be grafted by heating and dispersing the silicon-containing compound in the polyolefin resin at a desired temperature. Any suitable mixing equipment may be utilized so long as the components are uniformly mixed. Examples may include but are not restricted to kneaders, Banbury mixers, screw extruders, or the like may be used.

When grafting is taking place using compounds which contain the required groups and at least one aliphatic unsaturated group, a free radical-initiator may be utilised to generate free radicals on the polyolefin which can react with the unsaturated groups described. Examples of suitable free radical-initiating compounds include but are not limited to organic peroxides such as substituted or unsubstituted dialkyl-, alkylaroyl-, diaroyl-peroxides, e.g., benzoyl peroxide and 2,4-dichlorobenzoyl peroxide, ditertiarybutyl peroxide, dicumyl peroxide, t-butyl cumyl peroxide, bis(t-butylperoxyisopropyl) benzene bis(t-butylperoxy)-2,5-dimethyl hexyne 2,4-dimethyl-2,5-di(t-butylperoxy) hexane, di-t-butyl peroxide, 2,5-bis(tert-butyl peroxy)-2,5-dimethyl-hexane, t-butyl peracetate, 2,5-dimethyl-2,5-di-t-butyl peroxyhexane, 2,5-dimethyl-2,5-di-t-butyl peroxyhexine. Alternatively, t-butyl perbenzoate; azo compounds such as azobisisobutyronitrile and dimethylazodiisobutylate may be used but the organic peroxides being preferred for availability and ease of handling.

Where such a free radical-initiating compound is used, it is sometimes advantageous to heat the system to a sufficient temperature for free radicals to release. More particularly, a temperature above the softening point of the polyolefin resin is chosen for efficient mixing and a temperature between 100° C. and 200° C. is chosen for efficient release of free radicals. Thus, treatment at a temperature between 100° C. and 200° C. and above the softening point of the polyolefin resin is recommended. The free radical-initiating compound is preferably blended in amounts of about 0.01 to about 2 parts, more preferably about 0.05 to about 0.5 parts by weight per 100 parts by weight of the polyolefin resin.

It is to be understood that where the silicon-containing compound used is a polymer, it is unnecessary to heat and mix the polymer and the polyolefin resin in the presence of a free radical-initiating compound. Simple mixing of the components above the softening point of the polyolefin resin will generate the grafted polyolefins required.

Once the polyolefin-based copolymer or grafted polyolefin, which polyolefin-based copolymer or grafted polyolefin contains silyl trialkoxy groups, carboxylic acid groups and/or —OH groups has been prepared, it is formed into a predetermined shaped article using any suitable method e.g., molding. The shape of the shaped article is not particularly limited and may take the form of, for the sake of example, a film, sheet, fiber, plate, rod, bar or another shape dependent on the end use of the article. Any suitable technique may be utilised in accordance with conventional polyolefin resin forming techniques e.g., a suitable molding process. One exemplary known technique is to pelletize the modified polyolefin resin, heating the resin at or above its softening point, injecting the resin into a mold cavity, and cooling the resin below its softening point. Any desired molding machine such as injection molding and transfer molding machines may be used.

The hydrosilylation curable silicone elastomer composition typically comprises

Component (i), one or more polydiorganosiloxane polymer(s) having a viscosity of from 1000 to 500,000 mPa·s at 25° C. containing at least two alkenyl groups and/or alkynyl groups per molecule Component (ii) a reinforcing filler such as finely divided silica optionally treated with one or more known filler treating agents;

Component (iii) an organohydrogenpolysiloxane having at least 2, alternatively at least 3 silicon-bonded hydrogen atoms per molecule; and Component (iv) a hydrosilylation catalyst; and may also comprise one or more suitable additives; and Component (v) one or adhesion promoters.

Component (i) of the hydrosilylation curable silicone elastomer composition is one or more polydiorganosiloxane polymer(s) having a viscosity of from 1000 to 500,000 mPa·s at 25° C. containing at least two alkenyl groups and/or alkynyl groups per molecule. Polydiorganosiloxane polymer (i) has multiple units of the formula (I):

$$R_aSiO_{(4-a)/2} \qquad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Siloxy units may be described by a shorthand (abbreviated) nomenclature, namely—"M," "D," "T," and "Q", when R is an organic group, typically methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of typical groups on the polydiorganosiloxane polymer (i) include mainly alkenyl, alkyl, and/or aryl groups. The groups may be in pendent position (on a D or T siloxy unit) or may be terminal (on an M siloxy unit). Suitable alkenyl groups in polydiorganosiloxane polymer (i) typically contain from 2 to 10 carbon atoms, e.g., vinyl, isopropenyl, allyl, and 5-hexenyl.

The silicon-bonded organic groups attached to polydiorganosiloxane polymer (i) other than alkenyl groups and/or alkynyl groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with groups that do not interfere with curing of this inventive composition, such as halogen atoms. Preferred species of the silicon-bonded organic groups are, for example, alkyl groups such as methyl, ethyl, and propyl; and aryl groups such as phenyl.

The molecular structure of polydiorganosiloxane polymer (i) is typically linear, however, there can be some branching due to the presence of T units (as previously described) within the molecule.

To achieve a useful level of physical properties in the elastomer prepared by curing the composition as hereinbefore described the viscosity of polydiorganosiloxane polymer (i) should be at least 1000 mPa·s at 25° C. The upper limit for the viscosity of polydiorganosiloxane polymer (i) is limited to a viscosity of up to 500,000 mPa·s at 25° C.

Generally, the or each polydiorganosiloxane containing at least two silicon-bonded alkenyl groups per molecule of component (i) has a viscosity of from 1000 mPa·s to 150,000 mPa·s at 25° C., alternatively from 2000 mPa·s to 125,000 mPa·s, alternatively from 2000 mPa·s to 100,000 mPa·s at 25° C. measured using a Brookfield® rotational viscometer using Spindle (LV-4) for viscosities in the range between 1,000-2,000,000 mPa·s and adapting the speed according to the polymer viscosity.

The polydiorganosiloxane polymer (i) may be selected from polydimethylsiloxanes, alkylmethylpolysiloxanes, alkylarylpolysiloxanes or copolymers thereof containing e.g., alkenyl and/or alkynyl groups and may have any suitable terminal groups, for example, they may be trialkyl terminated, alkenyldialkyl terminated or may be terminated with any other suitable terminal group combination providing each polymer contains at least two alkenyl groups and/or alkynyl groups per molecule. Hence the polydiorganosiloxane polymer (i) may be, for the sake of example, dimethylvinyl terminated polydimethylsiloxane, dimethylvinylsiloxy-terminated dimethylmethylphenylsiloxane, trialkyl terminated dimethylmethylvinyl polysiloxane or dialkylvinyl terminated dimethylmethylvinyl polysiloxane copolymers.

For example, a polydiorganosiloxane polymer (i) containing alkenyl groups and/or alkynyl groups at the two terminals may be represented by the general formula (II):

$$R'R''R'''SiO—(R''R'''SiO)_m—SiOR'''R''R' \qquad (II)$$

In formula (II), each R' may be an alkenyl group or an alkynyl group, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl an alkynylated cyclohexyl group, heptynyl, octynyl, nonynyl, decynyl or similar linear and branched alkenyl groups and alkenylated aromatic ringed structures.

R" does not contain ethylenic unsaturation, Each R" may be the same or different and is individually selected from monovalent saturated hydrocarbon group, which typically contain from 1 to 10 carbon atoms, and monovalent aromatic hydrocarbon group, which typically contain from 6 to 12 carbon atoms. R" may be unsubstituted or substituted with one or more groups that do not interfere with curing of this inventive composition, such as halogen atoms. R'" is R' or R".

Organopolysiloxane polymer (i), is typically present in an amount of from 40 to 80 wt. % of the composition.

(ii) Reinforcing Filler

Component (ii) of the hydrosilylation curable silicone elastomer composition is a reinforcing filler such as finely divided silica. Silica and other reinforcing fillers (ii) are often treated with one or more known filler treating agents to prevent a phenomenon referred to as "creping" or "crepe hardening" during processing of the curable composition.

Finely divided forms of silica are preferred reinforcing fillers (ii). Fumed silicas are particularly preferred because of their relatively high surface area, which is typically at least 50 m$^2$/g (BET method in accordance with ISO 9277:2010). Fillers having surface areas of from 50 to 450 m$^2$/g (BET method in accordance with ISO 9277:2010), alternatively of from 50 to 300 m$^2$/g (BET method in accordance with ISO 9277:2010), are typically used. Alternatively, the reinforcing silica may also be or include precipitated and/or colloidal silica. Each type of silica is commercially available.

The amount of reinforcing filler (ii) e.g., finely divided silica in the composition herein is from 5 to 40 wt. %, alternatively of from 5 to 30 wt. %. In some instances, the amount of reinforcing filler may be of from 7.5 to 30 wt. %, alternatively from 10 to 30 wt. % based on the weight of the composition, alternatively from 15 to 30 wt. % based on the weight of the composition.

When reinforcing filler (ii) is naturally hydrophilic (e.g., untreated silica fillers), it is typically treated with a treating agent to render it hydrophobic. These surface-modified reinforcing fillers (ii) do not clump and can be homogeneously incorporated into polydiorganosiloxane polymer (i) as the surface treatment makes the fillers easily wetted by polydiorganosiloxane polymer (i). This results in improved room temperature rheological properties of the compositions and resulting cured materials cured therefrom.

The surface treatment may be undertaken prior to introduction in the composition or in situ (i.e., in the presence of at least a portion of the other components of the composition herein by blending these components together at room temperature or above until the filler is completely treated. Typically, untreated reinforcing filler (ii) is treated in situ with a treating agent in the presence of polydiorganosiloxane polymer (i), whereafter mixing a silicone rubber base material is obtained, to which other components may be added.

Typically reinforcing filler (ii) may be surface treated with any low molecular weight organosilicon compounds disclosed in the art applicable to prevent creping of organosiloxane compositions during processing. For example, organosilanes, polydiorganosiloxanes, or organosilazanes e.g., hexalkyl disilazane, short chain siloxane diols or fatty acids or fatty acid esters such as stearates to render the filler(s) hydrophobic and therefore easier to handle and obtain a homogeneous mixture with the other components. Specific examples include but are not restricted to silanol terminated trifluoropropylmethyl siloxane, silanol terminated ViMe siloxane, tetramethyldi(trifluoropropyl)disilazane, tetramethyldivinyl disilazane, silanol terminated MePh siloxane, liquid hydroxyl-terminated polydiorganosiloxane containing an average from 2 to 20 repeating units of diorganosiloxane in each molecule, hexaorganodisiloxane, hexaorganodisilazane. A small amount of water can be added together with the silica treating agent(s) as processing aid.

The composition may include one or more optional additives but the total weight % of the composition is 100 wt. % and the alkenyl and/or alkynyl content of polymer (i) is determined by titration.

The composition as described herein is cured using a hydrosilylation cure package comprising an organohydrogenpolysiloxane having 3 or more silicon-bonded hydrogen atoms per molecule (component iii) and a hydrosilylation catalyst (component iv).

(iii) Organohydrogenpolysiloxane

Component (iii) of the hydrosilylation curable silicone elastomer composition is an organohydrogenpolysiloxane, which operates as a cross-linker for polymer (i), by the addition reaction of the silicon-bonded hydrogen atoms in component (iii) with the alkenyl groups in component (i) under the catalytic activity of component (iv) to be mentioned below. Component (iii) normally contains 3 or more silicon-bonded hydrogen atoms so that the silicon bonded hydrogen atoms of this component can sufficiently react with the alkenyl groups and/or alkynyl groups, typically alkenyl groups, especially vinyl groups of component (i) to form a network structure therewith and thereby cure the composition.

The molecular configuration of component (iii) is not specifically restricted, and it can be straight chain, branch-containing straight chain, or cyclic. While the molecular weight of this component is not specifically restricted, the viscosity is typically from 0.001 to 50 Pa·s at 25° C. using a plate/plate rheometer to obtain a good miscibility with component (i).

Examples of component (iii) of the hydrosilylation curable silicone elastomer composition include but are not limited to:
1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, trimethylsiloxy-endblocked methylhydrogenpolysiloxane, trimethylsiloxy-endblocked dimethylsiloxane/methylhydrogensiloxane copolymers, dimethylhydrogensiloxy-endblocked dimethylpolysiloxane, dimethylhydrogensiloxy-endblocked dimethylsiloxane/methylhydrogensiloxane copolymers, trimethylsiloxy-endblocked methylhydrogensiloxane/diphenylsiloxane copolymers, trimethylsiloxy-endblocked methylhydrogensiloxane/diphenylsiloxane/-dimethylsiloxane copolymers, trimethylsiloxy-endblocked methylhydrogensiloxane/methylphenylsiloxane/-dimethylsiloxane copolymers, dimethylhydrogensiloxy-endblocked methylhydrogensiloxane/dimethylsiloxane/-diphenylsiloxane copolymers, dimethylhydrogensiloxy-endblocked methylhydrogensiloxane/dimethylsiloxane/-methylphenylsiloxane copolymers, copolymers and/or silicon resins consisting of $(CH_3)_2HSiO_{1/2}$ units, $(CH_3)_3SiO_{1/2}$ units and $SiO_{4/2}$ units, copolymers and/or silicone resins consisting of $(CH_3)_2HSiO_{1/2}$ units and $SiO_{4/2}$ units, copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Component (iii) is typically present in the total composition in an amount of up to 10 wt. % of the composition but the amount present is typically determined by the molar ratio of the silicon-bonded hydrogen atoms in component (iii) to the total number of all unsaturated groups, e.g., alkenyl and alkynyl groups, often vinyl groups. In the present composition this ratio is from 1:1 to 20:1, preferably with Si—H being in excess.

iv) Hydrosilylation Catalyst

As hereinbefore described the hydrosilylation curable silicone elastomer composition is cured via a hydrosilylation reaction catalysed by a hydrosilylation (addition cure) catalyst (iv) that is a metal selected from the platinum metals, i.e., platinum, ruthenium, osmium, rhodium, iridium and palladium, or a compound of such metals. The metals include platinum, palladium, and rhodium but platinum and rhodium compounds are preferred due to the high activity level of these catalysts for hydrosilylation reactions.

Example of preferred hydrosilylation catalysts (iv) of the hydrosilylation curable silicone elastomer composition include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. The catalyst (iv) can be platinum metal, platinum metal deposited on a carrier, such as silica gel or powdered charcoal, or a compound or complex of a platinum group metal.

Examples of suitable platinum-based catalysts (iv) include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (iv) is present in the total composition in a catalytic amount, i.e., an amount or quantity sufficient to promote a reaction or curing thereof at desired conditions. Varying levels of the hydrosilylation catalyst (iv) can be used to tailor reaction rate and cure kinetics. The catalytic amount of the hydrosilylation catalyst (iv) is generally between 0.01 ppm, and 10,000 parts by weight of platinum-group metal, per million parts (ppm), based on the combined weight of the components (i) and (ii) and (v) when present; alternatively, between 0.01 and 5,000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

In order to prevent premature cure in storage, the composition will be stored prior to use in two parts Part A and Part B. Typically, Part A will contain some of polydiorganosiloxane polymer (i) and reinforcing filler (ii) and hydrosilylation catalyst (iv) and Part B will contain the remainder of polydiorganosiloxane polymer (i) and reinforcing filler (ii) together with components organohydrogenpolysiloxane (iii) and, if present, inhibitor. The two-part composition may be designed to be mixed together in any suitable ratio, dependent on the amounts of polydiorganosiloxane polymer (i) and reinforcing filler (ii) in Part B and as such can be mixed in a Part A:Part B weight ratio of from 15:1 to 1:1.

Adhesion Promoter

Component (v) of the hydrosilylation curable silicone elastomer composition is one or more adhesion promoters. Adhesion promoters may be provided in the hydrosilylation curable silicone elastomer composition but may also be applied onto the surface of the polyolefin resin or the silicone elastomer composition in the form of a primer or the like to enhance adhesion therebetween. Any suitable adhesion promoters may be utilised these may include one or more of any of the following (a) silane coupling agents, (b) organic compounds containing two or more acrylate groups, (c) reactive siloxanes (d) epoxy-containing alkoxysilanes and (e) condensation cure catalysts and/or a combination thereof.

Examples of silane coupling agents (a) include alkoxysilanes containing methacrylic groups or acrylic groups such as methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane;

Examples of organic compounds containing two or more acrylate groups (b) include, e.g., diacrylates such as $C_{4-20}$ alkanediol diacrylate such as hexanediol diacrylate, heptanediol diacrylate, octanediol diacrylate, nonanediol diacrylate, and/or undecanediol diacrylate; and/or pentaerythritol tetraacrylate.

Examples of the reactive siloxanes (c) include siloxanes such as hydroxy-terminated dimethyl-methylvinyl siloxane trimethylsiloxy-terminated methylhydrogen siloxane in each case optionally containing one or more perfluoroalkyl chains, such as trifluoropropyl or perfluorobutylethyl side chains. Hence, the siloxanes (c) are of a short chain length such that the viscosity thereof will be from 25 mPa·s at 25° C. up to about 1500 mPa·s at 25° C., alternatively up to about 1000 mPa·s at 25° C.

Examples of epoxy-containing alkoxysilanes (d) may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Examples of condensation cure catalysts (e) include: zirconium chelate compound such as zirconium (IV) tetraacetyl acetonate, zirconium (IV) hexafluoroacetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), diisopropoxy bis (2,2,6,6-tetramethyl-heptanethionate) zirconium, or similar zirconium complexes having β-diketones (including alkyl-substituted and fluoro-substituted forms thereof); organic tin metal catalysts such as triethyltin tartrate, tin octoate, tin oleate, tin catalysts include tin triflates, organic tin metal catalysts such as triethyltin tartrate, tin octoate, tin oleate, tin naphthenate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate; Titanate based catalysts may comprise a compound according to the general formula Ti[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R$^{22}$ include but are not restricted to methyl, ethyl, propyl, isopropyl, butyl, tertiary butyl and a branched secondary alkyl group such as 2,4dimethyl-3-pentyl. Preferably, when each R$^{22}$ is the same, R$^{22}$ is an isopropyl, branched secondary alkyl group or a tertiary alkyl group, in particular, tertiary butyl. Alternatively, the titanate may be chelated. The chelation may be with any suitable chelating agent such as an alkyl acetylacetonate such as methyl or ethylacetylacetonate; and Other condensation catalysts incorporating lead, antimony, iron, cadmium, barium, manganese, zinc, hafnium chromium, cobalt, nickel, aluminium, gallium and germanium.

The adhesion promoter/primer may be a reaction product of two or more of the above for example the adhesion promoter may be a mixture and/or reaction product of A') nonanediol diacrylate, 1,1,5,5-tetramethyl-3,3-diphenyltrisiloxane, trimethylsiloxy-terminated methylhydrogen siloxane, glycidoxypropyltrimethoxysilane, hydroxy-terminated dimethyl-methylvinyl siloxane, and zirconium acetylacetate; B') glycidoxypropyltrimethoxysilane, hydroxy-terminated dimethyl-methylvinyl siloxane, and zirconium acetylacetate; or (C') trimethylsiloxy-terminated methylhydrogen siloxane, glycidoxypropyltrimethoxysilane, hydroxy-terminated dimethyl-methylvinyl siloxane, and zirconium acetylacetate. Component (V) the adhesion promoter(s) may be present in a range of from 0.5 to 10 wt. % of the composition, alternatively from 0.5 to 6 wt. % of the composition.

Additives

Additives may be present in the curable silicone elastomer composition described herein. The presence of the additives will depend on the intended end use of the integral layered article and the physical properties required by the curable silicone elastomer composition. For example, given the silicone elastomer composition is cured via hydrosilylation, inhibitors designed to inhibit the reactivity of the hydrosilylation catalysts may be utilised.

Inhibitor

To obtain a longer working time or pot life of the hydrosilylation curable silicone elastomer composition because a hydrosilylation cure system is being utilised, a suitable inhibitor may be incorporated into the composition in order to retard or suppress the activity of the catalyst.

Inhibitors of platinum metal-based catalysts, generally a platinum metal-based catalyst is well known in the art. Hydrosilylation or addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (iv) will in some instances impart satisfactory storage stability and cure rate. In other instances, inhibitor concentrations of up to 500 moles of inhibitor per mole of the metal of catalyst (iv) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10 wt. % of the composition. Mixtures of the above may also be used.

Other Additives

Commonly used other additives may be present in the hydrosilylation curable silicone elastomer composition as and when required depending on the intended use of the integral modified polyolefin resin/silicone elastomer layered article and the curable silicone elastomer composition. Examples of additives include non-reinforcing fillers, electrically conductive fillers, thermally conductive fillers, non-conductive filler, pot life extenders, flame retardants, pigments, colouring agents, chain extenders, heat stabilizers, compression set improvement additives and mixtures thereof.

Non-Reinforcing Filler

Non-reinforcing filler, when present, may comprise crushed quartz, diatomaceous earths, barium sulphate, iron oxide, titanium dioxide and carbon black, wollastonite and platelet type fillers such as, graphite, graphene, talc, mica, clay, sheet silicates, kaolin, montmorillonite and mixtures thereof. Other non-reinforcing fillers which might be used alone or in addition to the above include aluminite, calcium sulphate (anhydrite), gypsum, calcium sulphate, magnesium carbonate, aluminium trihydroxide, magnesium hydroxide (brucite), graphite, copper carbonate, e.g., malachite, nickel carbonate, e.g., zarachite, barium carbonate, e.g., witherite and/or strontium carbonate e.g., strontianite.

Non-reinforcing fillers when present may alternatively or additionally be selected from aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

Suitable sheet silicates e.g., silicate minerals which may be utilised include but are not limited to mica; $K_2Al_{14}$ $[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. When present, the non-reinforcing filler(s) is/are present up to a cumulative total of from 1 to 50 wt. % of the composition.

In one embodiment the non-reinforcing filler may include glass or the like micro beads or microspheres to enhance the thermal insulation of the material. The micro beads or microspheres may be glass e.g., for example borosilicate glass micro-beads and/or microspheres.

Whenever deemed necessary the non-reinforcing filler may also be treated as described above with respect to the reinforcing fillers (ii) to render them hydrophobic and thereby easier to handle and obtain a homogeneous mixture with the other components. As in the case of the reinforcing fillers (ii) surface treatment of the non-reinforcing fillers makes them easily wetted by polydiorganosiloxane polymer (i) when present which may result in improved properties of the compositions, such as better processability (e.g., lower viscosity, better mold releasing ability and/or less adhesive to processing equipment, such as two roll mill), heat resistance, and mechanical properties.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, aluminium nitride, silicon carbide, metal oxides (such as zinc oxide, magnesium oxide, and aluminium oxide, graphite, diamond, and mixtures or derivatives thereof.

Examples of non-conductive fillers include quartz powder, diatomaceous earth, talc, clay, mica, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The liquid curable silicone elastomer composition may thus be free of pot life extender.

Examples of flame retardants include aluminium trihydrate, magnesium hydroxide, calcium carbonate, zinc borate, wollastonite, mica and chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include carbon black, iron oxides, titanium dioxide, chromium oxide, bismuth vanadium oxide and mixtures or derivatives thereof.

Examples of colouring agents include vat dyes, reactive dyes, acid dyes, chrome dyes, disperse dyes, cationic dyes and mixtures thereof.

Examples of chain extenders include disiloxane or a low molecular weight polyorganosiloxane containing two silicon-bonded hydrogen atoms at the terminal positions. The chain extender typically reacts with the alkenyl groups and/or alkynyl groups of polydiorganosiloxane polymer (i), thereby linking two or more molecules of polydiorganosiloxane polymer (i) together and increasing its effective molecular weight and the distance between potential cross-linking sites.

A disiloxane is typically represented by the general formula $(HR^a_2Si)_2O$. When the chain extender is a polyorganosiloxane, it has terminal units of the general formula $HR^a_2SiO_{1/2}$ and non-terminal units of the formula $R^b_2SiO$. In these formulae, $R^a$ and $R^b$ individually represent unsubstituted or substituted monovalent hydrocarbon groups that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

Where the optional additives may be used for more than one reason e.g., as a non-reinforcing filler and flame retardant, when present they may function in both roles. When or if present, the aforementioned additional components are cumulatively present in an amount of from 0.1 to 30 wt. %, alternatively of from 0.1 to 20 wt. % based on the weight of the composition. The additives may be introduced into the silicone elastomeric composition in either Part A or Part B as required.

The individual parts of the hydrosilylation curable silicone elastomer composition may be prepared in any way suitable. Any mixing techniques and devices described in the prior art can be used for this purpose. The particular device to be used will be determined dependent on the viscosities of components and the final curable coating composition. Suitable mixers include but are not limited to paddle type mixers and kneader type mixers. Cooling of components during mixing may be desirable to avoid premature curing of the composition.

The order for mixing components in the hydrosilylation curable silicone elastomer composition is not critical. Suitable Parts A and B are prepared separately and then Part A and Part B are mixed together shortly prior to use.

When Part A and Part B are mixed together, the hydrosilylation curable silicone elastomer composition disclosed herein may comprise:
Polydiorganosiloxane (i) in an amount of 30 to 75 wt. % of the composition, reinforcing filler (ii) in an amount of from 5 to 40 wt. %, alternatively of from 5 to 30 wt. %, alternatively from 7.5 to 30 wt. % alternatively from 10 to 30 wt. % of the composition; organohydrogenpolysiloxane (iii) in an amount of from 0.5 to 10 wt. %, alternatively from 1 to 10 wt. %, alternatively from 2 to 10 wt. % of the composition, hydrosilylation catalyst (iv) in an amount of from 0.01 to 1 wt. % of the composition; and when present inhibitor may be present in an amount of from 0.0125 to 10 wt. % of the composition. Component (v) may be present in a range of from 0.5 to 10 wt. % of the composition, alternatively from 0.5 to 6 wt. % of the composition. It will be appreciated that for all compositions the total wt. % is 100 wt. %.

The adhesion promoter may be added into the hydrosilylation curable silicone elastomer composition at the time of mixing components A and B or immediately after mixing Parts A and B. Alternatively, providing it will not initiate premature cure, the adhesion promoter may be stored in either Part A or Part B prior to mixing.

The hydrosilylation curable silicone elastomer composition may dependent on viscosity and application etc., be further processed and/or applied on to the polyolefin layer by injection moulding, encapsulation moulding, press moulding, dispenser moulding, extrusion moulding, transfer moulding, press vulcanization, centrifugal casting, calendaring, bead application or blow moulding.

Curing of the hydrosilylation curable silicone elastomer composition may be carried out at a suitable temperature for hydrosilylation cure. The cure temperature used for curing the silicone elastomer may, given it is being applied onto the grafted polyolefin or olefin copolymer shaped article is less than the melt temperature of said grafted polyolefin or olefin copolymer onto which the silicone elastomeric composition is being cured. For example, a cure temperature of from about 50° C. to 180° C., alternatively from 50° C. to 150° C., alternatively of from 50° C. to 100° C. which upper limit is dependent on the melt temperature of the chosen grafted polyolefin or olefin copolymer onto which the silicone elastomeric composition is being cured. Curing may take place within any suitable period e.g., a period of from 30 min to 960 min dependent on the materials being utilised and or the cure temperature.

An integral polyolefin resin/silicone elastomeric material article is obtained by applying a hydrosilylation curable silicone elastomer composition onto a preformed article of the grafted polyolefin resin or polyolefin co-polymer and curing the silicone rubber to the polyolefin resin at a temperature below the softening point of the polyolefin resin and causing the reactive groups of the grafted polyolefin or reactive groups of the polyolefin co-polymer to react groups linked to the silicone elastomer composition at the polyolefin/silicone elastomer interface. The article made from the grafted polyolefin or polyolefin co-polymer is either partially or completely covered with the silicone elastomer composition as required for the end purpose. The silicone elastomer composition may be applied in any suitable form e.g., sheet form or by coating/dipping and heating the coated preformed polyolefin e.g., a molding, to a suitable temperature to cure the silicone elastomer composition and thereafter form an integral grafted polyolefin or polyolefin co-polymer/silicone elastomer molded article.

Alternatively, the grafted polyolefin or polyolefin co-polymer may have hydrosilylation curable silicone elastomer composition applied to it and then the combination may be heated and compressed for a pre-determined time and temperature.

A still further alternative procedure involves primary injection of the grafted polyolefin or polyolefin co-polymer into a mold cavity by means of e.g., an injection molding machine to form a desired shape of the grafted polyolefin or polyolefin co-polymer and subsequently injecting an uncured silicone rubber into the cavity and around the shape and curing to provide said integral layered article.

For example once a modified polyolefin plaque has been prepared, a suitable hydrosilylation curable silicone elastomer composition as described above may be prepared. An integral modified polyolefin resin/silicone elastomer layered article may then be prepared by curing the hydrosilylation curable silicone elastomer composition onto pre-formed e.g., pre-molded plaques of modified polyolefin e.g., via the follow process:

A chase may be placed on a polytetrafluoroethylene sheet which may be positioned on a support plate. A pre-formed modified polyolefin resin article may be placed in the chase and a polytetrafluoroethylene sheet or strip may be placed on top of the modified polyolefin resin plaques as a template leaving the sections of the modified polyolefin resin to be integrally combined with the silicone elastomeric material exposed. Silicone elastomer composition (also referred to herein as liquid silicone rubber) may then applied onto modified polyolefin resin and a wire mesh strip placed on top of silicone. Finally, an e.g., polytetrafluoroethylene sheet is placed on top followed by a support plate. The entire chase may then be placed into a hot press at desired temperature for example ranging from 60° C. to 180° C. but typically below the melt temperature of the plaque, e.g., <120° C., alternatively 90° C.) under a pressure of between about 9 and 20 MPa, alternatively between 9 and 15 MPa, alternatively 10.0 to 13 MPa for a desired length of time e.g., for the sake of example for a period of time ranging from e.g., 30 min to 960 min, alternatively 30 min to 600 min, alternatively 30 min to 300 min, alternatively 30 min to 120 min.

The provision of functional groups (e.g., hydroxyl, carboxylic acid and silane) into polyolefin resins and/or co-polymers provides accessible chemical linkages to bond to components added in liquid silicone elastomers/rubbers and avoids the required use of surface treatment technology (e.g., corona and plasma) onto polyolefin parts which in turn reduces cycle time and manufacturing cost of such integral layered articles.

The integrally layered articles as hereinbefore described may be utilised for any articles which benefit from the combination of chemically bound polyolefin-based layers and silicone elastomeric layers.

Examples of such composite parts can be found in various industries including, but not limited to, automotive applications, medical applications, consumer and industrial applications, electronic applications and 3-D printing applications. In automotive applications, this may include housings with a silicone seal or gasket, plugs and connectors, components of various sensors, membranes, diaphragms, climate venting components, and the like. In medical applications composite parts may be used in devices such as masks, goggles, tubing and valves catheters, ostomy appliances, respiratory appliances, feeding appliances, contact lenses, hearing aids, orthotics, prosthesis, and the like. In consumer and industrial applications composite parts may be found in shower heads, bakery ware, spatulas, home appliances, footwear, e.g., shoes, goggles, sports and leisure articles, diving masks, face masks, furniture, pacifiers and other baby articles, feeding accessories, seals and surfaces of white good and other kitchen articles, and the like. Electronic applications may include mobile phone cover seal, mobile phone accessories e.g., cell phone cases, precision electronic equipment, electrical switches and switch covers, watches and wristbands, wearable electronic devices, and the like.

EXAMPLES

In the following examples several grafted polyolefins, polyolefin copolymers and ungrafted polyolefins and mixtures thereof were utilised for the examples and counter examples. It will be seen that these were a mixture of commercial/modified commercial and laboratory prepared materials.

TABLE 1

Copolymers and Grafted Polymers used in the Examples

| | |
|---|---|
| Si-Link ™ DFDA-5451 NT | an ethylene vinyltrimethoxy silane copolymer polyethylene copolymer (Dow Chemical Company) |
| PRIMACOR ™ 1410 | a heat sealable ethylene acrylic acid (EAA) copolymer (Dow Chemical Company) |
| Soarnol ™ DT2904RB | an ethylene vinylalcohol copolymer having a 29 mol % ethylene content (Noltex, LLC) |
| DOW ™ LDPE 5011 | a low-density polyethylene (Dow Chemical Company) |
| Developmental ethylene/a-olefin copolymer 1 (DC1) | a developmental ethylene/a-olefin copolymer made using a transition metal catalyst in a solution polymerization process having a nominal density of 0.880 g/cm³ and a nominal melt index ($I_2$ @ 190° C.) of 18 g/10 min. |
| Developmental ethylene/a-olefin copolymer 2 (DC2) | a developmental ethylene/α-olefin copolymer made using a transition metal catalyst in a solution polymerization process having a nominal density of 0.900 g/cm³ and a nominal melt index ($I_2$ @ 190° C.) of 30 g/10 min. |
| DC1/DC2 blend | a 40/60 wt. %/wt. % blend of DC1 and DC2. |
| Grafted DC1/DC2 blend | a 40/60 wt. %/wt. % blend of DC1 and DC2 to which trimethoxysilane groups have been grafted |
| DC3 | DC 1 with 1.26 wt. % of vinyl trimethoxysilane (VTMS) grafted thereto |
| DC4 | DC 1 with 2.27 wt. % of VTMS grafted thereto |
| DC5 | DC 1 with 3.12 wt. % of VTMS grafted thereto |
| DC6 | DC 1 with 3.87 wt. % of VTMS grafted thereto |

DC 3-6 were prepared by reactive extrusion using a Coperion ZSK-26 twin-screw extruder having 26 mm diameter twin-screws with a length to diameter ratio of the extruder is 44:1; a loss-in-weight feeder (K-Tron model KCLQX3) used to feed the DC 1 copolymer, an ISCO pump (model 1000D) for injecting a solution of VTMS and 2,5-bis(tert-butylperoxy)-2,5-dimethylhexane into the extruder. A devolatilizing system was utilised for removing unreacted VTMS and any formed by-products. A Gala underwater system utilizing a two-hole die with 3 mm diameter was subsequently used to pelletize the produced silane-grafted high-density polyethylene.

1) Method to prepare the layered article:
Modification of the polyolefin resin in the melt using for example twin-screw extruders or Haake mixers. Production of ethylene-based copolymers via a high pressure process in the gas-phase and in the presence of a thermal radical initiator.
Injection molding of the modified polyolefin to produce a molded plaque Preformed parts of the polyolefin-based materials as described in Table 1 and prepared as described above were injection molded using an injection molding machine from Toyo Machinery & Metal Co Ltd of Japan ("Toyo"). The Toyo injection molding machine utilised is a 110 ton press equipped with a 32 mm diameter single-screw plasticator which has an L/D (length to diameter) ratio of 20:1. The screw utilised in the press was an Eagle mixing screw supplied by Westland Corp. The feed and transition sections of the Eagle mixing screw were of standard design e.g., like a general purpose screw. The metering section of the Eagle mixing screw possessed a mixing section comprised of two spiral in-flow and two spiral out-flow channels. This mixing flight contained within the mixing section of the screw possessed an undercut that provided a degree of dispersive mixing. This mixing flight also contained bypass channels that provided a degree of distributive mixing. Plaques with a dimension of 101.6×152.4 mm were prepared for each polyolefin-based material sample by injection molding using the above with the conditions indicated in Tables 2a-2d below which were set on the machine.

TABLE 2a

Injection molding conditions for the polyolefin-based materials used

| Material | Barrel temp. (zones 1 to 4, nozzle straight profile (° C.) | Mold temp. (° C.) | Hold time (sec) | Hold pressure (MPa) | Cooling time (sec) |
|---|---|---|---|---|---|
| Si-Link ™ DFDA-5451 NT | 215 | 43 | 15 | 44.81 | 18 |
| Grafted DC1/DC2 blend | 215 | 43 | 15 | 44.81 | 18 |
| DC1/DC2 blend | 215 | 43 | 15 | 44.81 | 18 |
| PRIMACOR ™ 1410[a] | 215 | 43 | 15 | 44.81 | 18 |

TABLE 2b

Injection molding conditions for the polyolefin-based materials used

| Material | Barrel temp. (zones 1 to 4, nozzle straight profile (° C.) | Mold temp. (° C.) | Hold time (sec) | Hold pressure (MPa) | Cooling time (sec) |
|---|---|---|---|---|---|
| Blend of Soarnol ™ DT2904RB/DOW ™ LDPE 5011 (20/80 wt. %/wt. %) | 215 | 43 | 15 | 44.81 | 18 |
| DOW ™ LDPE 5011 | 215 | 43 | 15 | 44.81 | 18 |
| Soarnol ™ DT2904RB[b] | 215 | 43 | 15 | 44.81 | 18 |
| DC3 | 215 | 43 | 15 | 44.81 | 18 |
| DC4 | 215 | 43 | 15 | 44.81 | 18 |
| DC5 | 215 | 43 | 15 | 44.81 | 18 |
| DC6 | 215 | 43 | 15 | 44.81 | 18 |

Sample was dried at 80° C. for 24 hours (h) apart from in the case of when using Soarnol™ DT2904RB which was dried at 110° C. for 24 h for both the blend and alone.

TABLE 2c

Injection molding conditions for the polyolefin-based materials used

| Material | Back pressure (MPa) | Screw rotation (rpm) | Injection speed (cm³/sec) | Shot size (cm³) | Transfer (cm³) |
|---|---|---|---|---|---|
| Si-Link ™ DFDA-5451 NT | 4.48 | 85 | 36 | 65 | 12 |
| Grafted DC1/DC2 blend | 4.48 | 85 | 36 | 65 | 12 |
| DC1/DC2 blend | 4.48 | 85 | 36 | 65 | 12 |
| PRIMACOR ™ 1410[a] | 4.48 | 85 | 36 | 65 | 12 |

TABLE 2d

Injection molding conditions for the polyolefin-based materials used

| Material | Back pressure (MPa) | Screw rotation (rpm) | Injection speed (cm³/sec) | Shot size (cm³) | Transfer (cm³) |
|---|---|---|---|---|---|
| Blend of Soarnol ™ DT2904RB/DOW ™ LDPE 5011 (20/80 wt. %/wt. %) | 4.48 | 85 | 36 | 65 | 12 |
| DOW ™ LDPE 5011 | 4.48 | 85 | 36 | 65 | 12 |
| Soarnol ™ DT2904RB | 4.48 | 85 | 36 | 65 | 12 |
| DC3 | 4.48 | 85 | 36 | 65 | 12 |
| DC4 | 4.48 | 85 | 36 | 65 | 12 |
| DC5 | 4.48 | 85 | 36 | 65 | 12 |
| DC6 | 4.48 | 85 | 36 | 65 | 12 |

A single liquid silicone rubber formulation was used throughout the examples. It was prepared by mixing two masterbatches and several components together. The LSR composition was stored in two parts prior to use to prevent premature cure. In this instance this was particularly important given the example compositions do not contain any hydrosilylation cure inhibitors. The vinyl content was determined by titration and silicone bonded hydrogen (Si—H) values provided were determined by quantitative infrared analysis in accordance with ASTM E168. Viscosity values of siloxane polymers (e.g., component (i)) were measured using a Brookfield® rotational viscometer using Spindle (LV-4) for viscosities in the range between 1,000-2,000,000 mPa·s and adapting the speed according to the polymer viscosity and all viscosity measurements were taken at 25° C. unless otherwise indicated." The compositions of the two masterbatches used are provided in Table 3 below:

TABLE 3

LSR Masterbatches utilised

| | MB 1 (wt. %) | MB 2 (wt. %) |
|---|---|---|
| Dimethylvinyl terminated dimethyl Siloxane having a viscosity of 55,000 mPa · s and a vinyl content of 0.09 wt. % | 69.19 | 63.14 |
| Hexamethyldisilazane | 4.72 | 5.55 |
| CAB-O-SIL ® MS-75 Fumed silica | 25.15 | 29.54 |
| tetramethyldivinyldisilazane | 0.0 | 0.3 |
| HO[Si(Me)$_2$—O]$_2$[Si(methylvinyl)-O]—H | 0.0 | 0.37 |
| Water | 0.94 | 1.1 |
| Total | 100 | 100 |

CAB-O-SIL ® MS-75 Fumed silica is commercially available from the Cabot Corporation Table 4 below describes the Part A and Part B compositions of the 2-part LSR composition used in all examples and comparative examples described below.

TABLE 4

Part A and Part B compositions used in the following Examples

| | Part A (wt. %) | Part B (wt. %) |
|---|---|---|
| MB 1 | 17.68 | 17.27 |
| MB 2 | 70.72 | 69.08 |
| Dimethylvinyl terminated dimethyl Siloxane having a viscosity of 55,000 mPa · s and a vinyl content of 0.09 wt. % | 6.17 | 4.60 |

TABLE 4-continued

Part A and Part B compositions used in the following Examples

| | Part A (wt. %) | Part B (wt. %) |
|---|---|---|
| Dimethylvinyl terminated dimethyl methylvinyl siloxane copolymer having a dp of about 145 and a vinyl content of 1.09 wt. % | 4.25 | 5.48 |
| Platinum catalyst | 0.58 | |
| MQ silicone resin with Si—H groups on the M unit having an Si—H content of 9600 ppm | | 2.98 |
| HO[Si(Me)$_2$—O[$_2$[Si(methylvinyl)-O]—H | 0.60 | 0.60 |
| Total wt. % | 100 | 100 |

The MQ resin utilised as a cross-linker was done so with a view to help reduce the cure temperature required for the liquid silicone rubber composition given the need to cure at a temperature below the melt temperature of the polyolefin-based material on to which it is being cured. No inhibitor was included in the Part B composition.

In the Examples which follow 3 alternative adhesion promoter packages were used in the examples and counter examples the content of these were as follows:

Adhesion Promoter Package A:
  nonanediol diacrylate (1 wt. %)
  1,1,5,5-tetramethyl-3,3-diphenyltrisiloxane (1 wt. %)
  trimethylsiloxy-terminated methylhydrogen siloxane (2 wt. %)
  glycidoxypropyltrimethoxysilane (0.5 wt. %)
  hydroxy-terminated dimethyl-methylvinyl siloxane (0.5 wt. %)
  and zirconium acetylacetate (1 wt. %).

Adhesion Promoter Package B
  glycidoxypropyltrimethoxysilane (0.5 wt. %)
  hydroxy-terminated dimethyl-methylvinyl siloxane (0.5 wt. %)
  and zirconium acetylacetate (1 wt. %).

Adhesion Promoter Package C
  trimethylsiloxy-terminated methylhydrogen siloxane (2 wt. %)
  glycidoxypropyltrimethoxysilane (0.5 wt. %)
  hydroxy-terminated dimethyl-methylvinyl siloxane (0.5 wt. %)
  zirconium acetylacetate (1 wt. %).

The compositions were made by mixing Part A and Part B compositions in a 1:1 ratio. The adhesion promoter packages were added after the mixing of Part A and Part B and the wt. % values above are relative to the wt. % of the total composition of Part A and Part B, hence 1 wt. % of nonanediol diacrylate means 1 wt. % of the total of Part A:Part B after mixing. The amount of each other ingredient in the adhesion promoter package used is calculated in the same way before introduction. The adhesion promoter package may be pre-mixed before addition into the Part A+Part B composition or each ingredient of the adhesion promoter package may be introduced into the Part A/Part B composition as is preferred. Unless otherwise indicated the adhesion promoter package utilised in the Examples was adhesion promoter package A.

For the present examples the liquid silicone rubber (LSR) composition was prepared as follows:
1) Each of the components of liquid silicone rubber Part A were introduced into a speedmixer cup. The resulting composition was then mixed for 3 times at 2200 rpm for 60 s with hand mixing in between.

Each of the components of liquid silicone rubber Part B were introduced into a speedmixer cup. The resulting composition was then mixed for 3 times at 2200 rpm for 60 s with hand mixing in between 3) 1:1 mix of Part A and Part B (as prepared respectively in 1 and 2 above) were mixed together and each ingredient of the selected adhesion promoter package was introduced individually into the Part A/Part B mixture individually and then the whole composition was mixed 3 times at 2200 rpm for 60 s with hand mixing in between.

In order to show that the LSR composition depicted in Table 4 provides the physical properties expected for a typical LSR several standard physical properties were determined and are shown in Tables 5a and 5b below for the LSR in Table 4 and also the LSR of Table 4 with adhesion package A introduced. Two samples were tested for each property and the values provided are the average of the two. Cure time values and scorch rate values were measured using a Monsanto MDR 2000 moving die rheometer. After mixing as described above samples were cured at the respective mold temperatures and times indicated in Table 7 below prior to testing the physical properties indicated.

TABLE 5a

LSR physical properties

|  | Durometer (shore A) (ASTM D2240) | Tensile strength (MPa) ASTM D412 (Die C) | Elongation (%) ASTM D412 (Die C) | 100% Modulus (MPa) ASTM D412 Die C) |
|---|---|---|---|---|
| LSR | 48.0 | 10.4 | 482.00 | 1.6 |
| LSR + adhesion promoter package A | 45.0 | 7.0 | 659.00 | 1.2 |

TABLE 5b

LSR physical properties

|  | Tear Strength (Die B) (ASTM D624) (kN/m) | Cure Time (t 90) (s) | Scorch time TS 2 (s) |
|---|---|---|---|
| LSR | 29.4 | 370.53 | 85.20 |
| LSR + adhesion promoter package A | 32.8 | 2128.05 | 661.20 |

Adhesion Examples

For all the following examples identical samples of the LSR compositions depicted in Table 4 with the appropriate adhesion promoter package added (where required) were used for application to a variety of modified polyolefin plaque. Tables 6a and 6b list the modified polyolefin plaques utilised as well as the adhesion promoter package added into the LSR.

TABLE 6a

The modified polyolefin plaques and adhesion promoter package used in comparatives 1 to 5

| Example | Polyolefin Resin | Adhesion Promoter |
|---|---|---|
| Comp 1 | DC1/DC2 blend | A |
| Comp 2 | DOW ™ LDPE 5011 | A |
| Comp. 3 | Si-Link ™ DFDA-5451 NT | ½ amount A |

TABLE 6a-continued

The modified polyolefin plaques and adhesion promoter package used in comparatives 1 to 5

| Example | Polyolefin Resin | Adhesion Promoter |
|---|---|---|
| Comp. 4 | Si-Link ™ DFDA-5451 NT | B |
| Comp. 5 | Si-Link ™ DFDA-5451 NT | C |

TABLE 6b

The modified polyolefin plaques and adhesion promoter package used Examples 1-10

| Example | Polyolefin Resin | Adhesion Promoter |
|---|---|---|
| Ex. 1 | Si-Link ™ DFDA-5451 NT | A |
| Ex. 2 | Si-Link ™ DFDA-5451 NT | A |
| Ex. 3 | Grafted DC1/DC2 blend | A |
| Ex. 4 | PRIMACOR ™ 1410a | A |
| Ex. 5 | Blend of Soarnol ™ DT2904RB/DOW ™ LDPE 5011 (20/80 wt. %/wt. %) | A |
| Ex. 6 | Soarnol ™ DT2904RB | A |
| Ex. 7 | DC3 | A |
| Ex. 8 | DC4 | A |
| Ex. 9 | DC5 | A |
| Ex. 10 | DC6 | A |

Modified polyolefin plaques were prepared having the size 101.6×154.4×3.17 mm. The modified polyolefin plastic plaque was cut into strips of 25.4×101.6×3.17 mm dimension. Each strip was then placed into a 25.4×152.4×6.35 mm channel within a 254×254 mm aluminum chase that is placed upon a 254×254 mm aluminum support plate. Part of the strip was then covered with a polytetrafluoroethylene coated sheet, leaving a 25.4×72.6 mm area of modified polyolefin plaques uncovered. The liquid silicone rubber composition containing adhesion promoter package A (in this group of tests) was applied on top of the strip, filling the channel. A 25.4×152.4 mm wire mesh screen was then placed on top of the liquid silicone rubber composition layer and a 254×254 mm polytetrafluoroethylene coated sheet was placed on the mesh screen and a 254×254 mm aluminum backer plate was placed thereover.

The chase and backer plates were then placed into a Greenard Hydrolair hot press (Greenerd Press & Machine Co. of New Hampshire USA) already heated to the desired mold temperature (as indicated in Table 7 below) and then pressed at a molding pressure of 11.37 MPa for a desired mold time (as indicated in Table 7 below). After the desired period of time, the chase was removed from the hot press, cooled rapidly in a Wabash Genesis Press type cold press (Wabash MPI, Wabash Indiana, USA). Once the chase had cooled to the touch, it was removed from the cold press. The backer plates were removed, and the polytetrafluoroethylene coated sheets were peeled off. The combined polyolefin/silicone layered articles were removed from the chase. Each article was then tested for adhesion by a 180° peel test on a TechPro tensiTECH Load Frame. The liquid silicone rubber layer was peeled from the plastic at 180° at a rate of 0.05 m/min and the adhesion strength is measured as an average over the entire test.

TABLE 7

|  | Mold Temp. (° C.) | Mold time (min) | Peel strength (N/mm) |
|---|---|---|---|
| Comp. 1 | 90 | 180 | 0.0 |
| Comp. 2 | 90 | 180 | 0.3 |

TABLE 7-continued

| | Mold Temp. (° C.) | Mold time (min) | Peel strength (N/mm) |
|---|---|---|---|
| Comp. 3 | 90 | 60 | 0.5 |
| Comp. 4 | 90 | 60 | 0.3 |
| Comp. 5 | 90 | 90 | 0.5 |
| Ex. 1A | 90 | 180 | 4.7 @ 0 h |
| | | | 6.0 @ 24 h |
| | | | 4.4 @ 168 h |
| Ex. 1B | 90 | 120 | 5.7 |
| Ex. 2 | 90 | 40 | 4.3 |
| Ex. 3 | 90 | 180 | 4.2 |
| Ex. 4 | 90 | 180 | 3.3 |
| Ex. 5 | 90 | 180 | 0.8 |
| Ex. 6 | 120 | 20 | 5.8 |
| Ex. 7 | 65 | 960 | 2.9 |
| Ex. 8 | 65 | 960 | 3.5 |
| Ex. 9 | 65 | 960 | 3.9 |
| Ex. 10 | 65 | 960 | 4.7 |

It will be appreciated that all the comparative examples had peel strength results of 0.5 N/mm or less and that all the examples had values of at least 0.8 N/mm and in most cases the peel strength was greater than 2.9 N/mm which is significantly improved over the comparative examples. Regarding the 0.8 value measured in example 5 it is to be noted that Soarnol™ DT2904RB is an ethylene vinylalcohol copolymer and as such when analysed in pure form works very well with a peel strength of 5.8 (Example 6). However, when diluted in low density polyethylene in the example 5 blend the available —OH are much diluted (20% EVOH/80% LDPE) resulting in the comparatively lower peel strength value of example 5.

What is claimed is:

1. An integral polyolefin-based resin/silicone elastomeric material article comprising:
   a shaped layer of a polyolefin-based copolymer or grafted polyolefin, which polyolefin-based copolymer or grafted polyolefin contains silyl trialkoxy groups, carboxylic acid groups and/or —OH groups; and
   a silicone elastomeric material layer chemically bound to the shaped layer, which silicone elastomeric material layer is cured from a hydrosilylation curable silicone elastomer composition comprising at least one adhesion promoter;
   wherein the adhesion promoter is selected from a mixture and/or reaction product of:
   A') nonanediol diacrylate, 1,1,5,5-tetramethyl-3,3-diphenyltrisiloxane, trimethylsiloxy-terminated methylhydrogen siloxane, glycidoxypropyltrimethoxysilane, hydroxy-terminated dimethyl-methylvinyl siloxane, and zirconium acetylacetate;
   B') glycidoxypropyltrimethoxysilane, hydroxy-terminated dimethyl-methylvinyl siloxane, and zirconium acetylacetate; or
   C') trimethylsiloxy-terminated methylhydrogen siloxane, glycidoxypropyltrimethoxysilane, hydroxy-terminated dimethyl-methylvinyl siloxane, and zirconium acetylacetate.

2. The integral polyolefin-based resin/silicone elastomeric material article in accordance with claim 1, obtainable or obtained by the steps of:
   preforming the polyolefin-based copolymer or grafted polyolefin into the shaped layer;
   contacting the shaped layer with the hydrosilylation curable silicone elastomer composition; and
   curing the hydrosilylation curable silicone elastomer composition causing the composition to chemically bind with the shaped layer at a temperature below the softening point of the polyolefin-based copolymer or grafted polyolefin to form the integral polyolefin-based resin/silicone elastomeric material article.

3. The integral polyolefin-based resin/silicone elastomeric material article in accordance with claim 1, wherein the polyolefin is selected from the group consisting of polyethylene, polypropylene, polyisobutylene, polybutylene, and combinations thereof.

4. The integral polyolefin-based resin/silicone elastomeric material article in accordance with claim 1, wherein the polyolefin-based copolymer is formed by copolymerization of an olefin monomer and an alkylene vinyl alcohol monomer or oligomer.

5. The integral polyolefin-based resin/silicone elastomeric material article in accordance with claim 1, wherein the grafted polyolefin containing silyl trialkoxy groups, carboxylic acid groups and/or —OH groups is a polyolefin grafted with a silicon-containing compound containing one or more of the aforementioned groups.

6. The integral polyolefin-based resin/silicone elastomeric material article in accordance with claim 1, wherein the hydrosilylation curable silicone elastomer composition comprises:
   (i) one or more polydiorganosiloxane polymer(s) having a viscosity of from 1000 to 500,000 mPa·s at 25° C. and containing at least two alkenyl groups and/or alkynyl groups per molecule;
   (ii) a reinforcing filler, optionally treated with at least one filler treating agent;
   (iii) an organohydrogenpolysiloxane having at least two, optionally at least three, silicon-bonded hydrogen atoms per molecule;
   (iv) a hydrosilylation catalyst; and
   (v) the adhesion promoter(s).

7. The integral polyolefin-based resin/silicone elastomeric material article in accordance with claim 6, wherein the hydrosilylation curable silicone elastomer composition further comprises one or more cure inhibitor(s).

8. The integral polyolefin-based resin/silicone elastomeric material article in accordance with claim 6, wherein the reinforcing filler (ii) is silica, optionally treated with at least one filler treating agent.

9. The integral polyolefin-based resin/silicone elastomeric material article in accordance with claim 1, wherein adhesion promoter is selected from a mixture and/or reaction product of:
   A') nonanediol diacrylate, 1,1,5,5-tetramethyl-3,3-diphenyltrisiloxane, trimethylsiloxy-terminated methylhydrogen siloxane, glycidoxypropyltrimethoxysilane, hydroxy-terminated dimethyl-methylvinyl siloxane, and zirconium acetylacetate.

10. The integral polyolefin-based resin/silicone elastomeric material article in accordance with claim 1, adapted for automotive applications, medical applications, consumer and industrial applications, electronic applications and/or 3-D printing applications.

11. A method for preparing the integral polyolefin-based resin/silicone elastomeric material article in accordance with claim 1, the method comprising the steps of:
   preforming the polyolefin-based copolymer or grafted polyolefin shaped layer;
   contacting the polyolefin-based copolymer or grafted polyolefin shaped layer with the hydrosilylation curable silicone elastomer composition; and
   curing the hydrosilylation curable silicone elastomer composition causing the composition to chemically bind with the polyolefin-based copolymer or grafted polyolefin shaped layer at a temperature below the softening point of the polyolefin-based copolymer or grafted polyolefin to form the integral polyolefin-based resin/silicone elastomeric material article.

12. The method in accordance with claim 11, wherein the polyolefin-based copolymer or grafted polyolefin shaped layer is either partially or completely covered with the hydrosilylation curable silicone elastomer composition in a sheet form or by coating/dipping and heating the coated preformed article to a suitable temperature to cure the hydrosilylation curable silicone elastomer composition and thereafter form an integral grafted polyolefin or polyolefin co-polymer/silicone elastomer layered article.

13. The method in accordance with claim 11, wherein the hydrosilylation curable silicone elastomer composition is processed and/or applied on to the polyolefin-based copolymer or grafted polyolefin shaped layer by injection moulding, encapsulation moulding, press moulding, dispenser moulding, extrusion moulding, transfer moulding, press vulcanization, centrifugal casting, calendaring, bead application or blow moulding.

14. The method in accordance with claim 11, wherein the polyolefin-based copolymer or grafted polyolefin shaped layer has the hydrosilylation curable silicone elastomer composition applied to it and then the combination is heated and compressed for a pre-determined time and temperature.

15. The method in accordance with claim 11, wherein the polyolefin-based copolymer or grafted polyolefin is injected into a mold cavity to form a desired shape and subsequently injecting the hydrosilylation curable silicone elastomer composition into the mold cavity and around the shape and curing to provide an integral layered article.

16. The integral polyolefin-based resin/silicone elastomeric material article in accordance with claim 1, in or adapted for housings with a silicone seal or gasket, plugs and connectors, components of sensors, membranes, diaphragms, climate venting components, masks, goggles, tubing and valves, catheters, ostomy appliances, respiratory appliances, feeding appliances, contact lenses, hearing aids, orthotics, prosthesis, shower heads, bakery ware, spatulas, home appliances, footwear, sports and leisure articles, diving masks, face masks, furniture, pacifiers, feeding accessories, seals and surfaces of white goods and other kitchen articles, mobile phone cover seals, mobile phone accessories, cell phone cases, precision electronic equipment, electrical switches and switch covers, watches and wristbands and/or wearable electronic devices.

17. The integral polyolefin-based resin/silicone elastomeric material article in accordance with claim 1, wherein the adhesion promoter is present in a range of from 0.5 to 10 wt. % of the hydrosilylation curable silicone elastomer composition.

18. The integral polyolefin-based resin/silicone elastomeric material article in accordance with claim 1, wherein the adhesion promoter is selected from a mixture and/or reaction product of:
B') glycidoxypropyltrimethoxysilane, hydroxy-terminated dimethyl-methylvinyl siloxane, and zirconium acetylacetate.

19. The integral polyolefin-based resin/silicone elastomeric material article in accordance with claim 1, wherein the adhesion promoter is selected from a mixture and/or reaction product of:
C') trimethylsiloxy-terminated methylhydrogen siloxane, glycidoxypropyltrimethoxysilane, hydroxy-terminated dimethyl-methylvinyl siloxane, and zirconium acetylacetate.

20. An integral polyolefin-based resin/silicone elastomeric material article comprising:
a shaped layer of a polyolefin-based copolymer or grafted polyolefin, which polyolefin-based copolymer or grafted polyolefin contains silyl trialkoxy groups, carboxylic acid groups and/or —OH groups; and
a silicone elastomeric material layer chemically bound to the shaped layer, which silicone elastomeric material layer is cured from a hydrosilylation curable silicone elastomer composition comprising at least one adhesion promoter;
wherein the adhesion promoter is selected from a mixture and/or reaction product of:
A') nonanediol diacrylate, 1,1,5,5-tetramethyl-3,3-diphenyl-trisiloxane, trimethylsiloxy-terminated methylhydrogen siloxane, glycidoxypropyltrimethoxysilane, hydroxy-terminated dimethyl-methylvinyl siloxane, and zirconium acetylacetate; and
wherein the adhesion promoter is present in a range of from 0.5 to 10 wt. % of the hydrosilylation curable silicone elastomer composition.

* * * * *